(12) United States Patent
Hamilton et al.

(10) Patent No.: US 7,962,506 B2
(45) Date of Patent: *Jun. 14, 2011

(54) SYSTEM FOR CREATING AND MODIFYING LISTS FOR ELECTRONIC DISTRIBUTION

(75) Inventors: Rick Allen Hamilton, Charlottesville, VA (US); Jenny S. Li, Danbury, CT (US); Brian Marshall O'Connell, Cary, NC (US); Keith Raymond Walker, Austin, TX (US); Susan Marie Williams, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/944,216

(22) Filed: Nov. 11, 2010

(65) Prior Publication Data

US 2011/0055344 A1    Mar. 3, 2011

Related U.S. Application Data

(63) Continuation of application No. 11/867,151, filed on Oct. 4, 2007, now Pat. No. 7,836,068.

(51) Int. Cl.
  *G06F 17/30* (2006.01)
(52) U.S. Cl. ........................................ 707/767
(58) Field of Classification Search .................. 707/767
  See application file for complete search history.

(56) References Cited

U.S. PATENT DOCUMENTS

| | | |
|---|---|---|
| 5,283,856 A | 2/1994 | Gross et al. |
| 5,377,354 A | 12/1994 | Scannell et al. |
| 5,664,207 A | 9/1997 | Crumpler et al. |
| 5,819,274 A | 10/1998 | Jackson, Jr. |
| 5,828,836 A | 10/1998 | Westwick et al. |
| 5,864,684 A | 1/1999 | Nielsen |
| 5,917,489 A | 6/1999 | Thurlow et al. |
| 6,047,310 A | 4/2000 | Kamakura et al. |
| 6,057,841 A | 5/2000 | Thurlow et al. |
| 6,081,707 A | 6/2000 | Christensen et al. |
| 6,148,064 A | 11/2000 | Christensen et al. |
| 6,434,601 B1 | 8/2002 | Rollins |
| 6,671,718 B1 | 12/2003 | Meister et al. |
| 6,895,427 B2 | 5/2005 | Quine et al. |
| 6,970,908 B1 | 11/2005 | Larky et al. |

(Continued)

OTHER PUBLICATIONS

Notice of Allowance (Mail Date Jul. 13, 2010) for U.S. Appl. No. 11/867,151, filed Oct. 4, 2007; Confirmation No. 8507.

(Continued)

*Primary Examiner* — Mark Andrew X Radtke
(74) *Attorney, Agent, or Firm* — Schmeiser, Olsen & Watts; Mark Vallone

(57) ABSTRACT

A system in which an initial distribution list is dynamically modified using criteria determined from the current entries in the list. After an originator generates a distribution list and prior to submission of the message to entries on the generated list, the entries in the created distribution list are examined. From this list, features of the entries are identified. From these features, criteria are generated that can be used to generate additional entries that may be included in the list. In one approach, the generated criteria are presented to the user for review and approval. If the originator approves the criteria, the generated list is modified to add additional entries to the distribution based on the generated criteria. If the originator rejects the criteria, the initially generated list is submitted and the message is sent to the entries on the initial list.

5 Claims, 7 Drawing Sheets

U.S. PATENT DOCUMENTS

| | | | |
|---|---|---|---|
| 7,039,639 B2 | 5/2006 | Brezin et al. |
| 7,042,588 B2 | 5/2006 | Ueda et al. |
| 7,051,076 B2 | 5/2006 | Tsuchiya |
| 7,155,419 B2 | 12/2006 | Blackman et al. |
| 7,181,496 B1 | 2/2007 | Edwards et al. |
| 7,249,160 B2 | 7/2007 | Nozaki et al. |
| 7,249,175 B1 | 7/2007 | Donaldson |
| 7,269,568 B2 | 9/2007 | Stiles et al. |
| 7,343,303 B2 | 3/2008 | Meyer et al. |
| 7,380,126 B2 | 5/2008 | Logan et al. |
| 7,454,195 B2 | 11/2008 | Lewis et al. |
| 7,467,183 B2 | 12/2008 | Arcuri et al. |
| 7,590,548 B2 | 9/2009 | Meyer et al. |
| 2002/0078052 A1 | 6/2002 | Cheng |
| 2002/0087534 A1 | 7/2002 | Blackman et al. |
| 2002/0103873 A1 | 8/2002 | Ramanathan et al. |
| 2003/0072488 A1 | 4/2003 | Barsness et al. |
| 2004/0199587 A1 | 10/2004 | McKnight |
| 2005/0010645 A1 | 1/2005 | Arshi et al. |
| 2005/0153686 A1 | 7/2005 | Kall et al. |
| 2006/0031328 A1 | 2/2006 | Malik |
| 2006/0075036 A1 | 4/2006 | Malik |
| 2006/0168057 A1 | 7/2006 | Warren et al. |
| 2007/0005708 A1 | 1/2007 | Juliano |
| 2007/0050456 A1 | 3/2007 | Vuong et al. |
| 2007/0143472 A1 | 6/2007 | Clark et al. |
| 2007/0261099 A1 | 11/2007 | Broussard et al. |
| 2008/0162652 A1 | 7/2008 | True et al. |
| 2008/0177994 A1 | 7/2008 | Mayer |
| 2009/0094240 A1 | 4/2009 | Bordeaux et al. |
| 2009/0113446 A1 | 4/2009 | Hamilton et al. |
| 2009/0182820 A1 | 7/2009 | Hamilton, II et al. |
| 2010/0049807 A1 | 2/2010 | Thompson |

OTHER PUBLICATIONS

Notice of Allowance (Mail Date Oct. 13, 2010) for U.S. Appl. No. 12/013,525, filed Jan. 14, 2008; Confirmation No. 8801.

Office Action (Mail Date Sep. 23, 2010) for U.S. Appl. No. 11/924,648, filed Oct. 26, 2007; Confirmation No. 1620.

Murray, Katherine; Chapter 2: Microsoft Office Outlook 2003 and Messaging; Published Mar. 26, 2003; [online]. < URL: http://www.microsoft.com/mspress/books/sampchap/6529.aspx#122 >. 11 pages.

D. L. Manager; Copyright 1998-2009 Geisel Envisioning International Ltd. [online]. Retrieved from the Internet Sep. 29, 2009. < URL: http://www.madsolutions.com/DL/Version5.0/WhatsNew.htm >. 1 page.

Microsoft® Systems Management Server (SMS); Chapter 4: Managing Collections and Queries; 2003; [online]. < URL: http://spa.its.uiowa.edu/ecm/imaging/SMS/Managing%20Collections%20and%20Queries.pdf >. pp. 96-124.

Microsoft® TechNet ; Chapter 11—Managing Collections and Queries; 2009; [online]. < URL: https://www.microsoft.com/technet/prodtechnol/sms/sms2/proddocs/smsadm/part3/smsad11.mspx?mfr=true >; 20 pages.

Phrase 1

Group Alpha

Alpha 1 (L)
Alpha 2 (E)
Alpha 3 (E)
Alpha 4 (P)
Alpha 5 (P)
Alpha 6 (P)

Group Beta

Beta 1 (L)
Beta 2 (E)
Beta 3 (E)
Beta 4 (E)
Beta 5 (P)
Beta 6 (P)
Beta 7 (P)
Beta 8 (P)

Phrase 2

Group Delta

Delta 1 (L)
Delta 2 (E)
Delta 3 (P)
Delta 4 (P)
Delta 5 (P)

Group Gamma

Gamma 1 (L)
Gamma 2 (L)
Gamma 3 (E)
Gamma 4 (E)
Gamma 5 (E)
Gamma 6 (E)
Gamma 7 (P)
Gamma 8 (P)
Gamma 9 (P)
Gamma 10 (P)
Gamma 11 (P)
Gamma 12 (P)

FIG. 4a

| |
|---|
| Alpha 3 |
| Alpha 4 |
| Alpha 5 |
| Alpha 6 |

FIG. 4b

SYSTEM FOR CREATING AND MODIFYING LISTS FOR ELECTRONIC DISTRIBUTION

This application is a continuation application claiming priority to Ser. No. 11/867,151, filed Oct. 4, 2007.

FIELD OF THE INVENTION

The present invention relates to a method for generating and modifying distribution lists for the purpose of electronic distribution of information to entries on the list and in particular, this invention relates to a method for automatically generating criteria for modifying a previously generated distribution list. The criteria are generated from features of the entries in the previously generated distribution list.

BACKGROUND OF THE INVENTION

Advancements in technology have made the electronic distribution of information a more convenient task. Satellites, telephone systems and communication networks such as the Internet provide many tools to communicate information. As a result of the ability to conveniently distribute information, organizations have incorporated these technological advancements into their operations. One approach in the mass distribution of information is to have distribution lists. These lists contain several names or entries that simultaneously receive information from a source. A result of the increasing number of potential data recipients is the difficultly in coordinating data delivery to a wide audience, e.g., a large number of recipients. Towards this end, distribution lists, or "mailing lists" in an electronic document context such as E-mail, have been developed to facilitate grouping and tracking recipients.

The creation of these lists can be a tedious and/or complex manual task, since there may be many list members requiring processing for entry on to the list. Some of these lists are manually created and other lists are automatically created based on characteristics of an environment, e.g., a "customers" list may refer to all customers of a computing system. However, regardless of how the list is created, in some instances, persons that need to receive the information are omitted from the distribution list. When omissions occur, the sender may not be aware of the omission or may not know of persons that need to receive the information. Traditional static distribution lists and dynamic distribution lists do not provide the features commonly needed in a multiple of usage scenarios.

There are several usages of distribution lists that are not efficiently addressed using present static or dynamic distribution lists. The present state of distribution lists does not provide the following functionality: (1) Permanent and Semi-permanent modification of static distribution lists from a message destination field; (2) Semi-temporary modification with a temporal component static distribution lists from a message destination field; and (3) Creation semi-permanent or permanent distribution lists by combining static or dynamic distribution lists using a variety of set operations.

Current technology has addressed some of the problems associated with modifying electronic distribution lists. U.S. patent application, publication number 2005/0010645 provides a method in which additive and subtractive message operations can be performed on a distribution list based in least in part on an intersection of various distribution lists to determine, if only temporarily, a new distribution list for a message. A particular distribution list may respectively be combined or intersected with an additive or a subtractive distribution list. Thus, for example, an e-mail message may be addressed to a distribution list for all employees, but where a subtractive list is applied to remove certain employees from receiving the e-mail message. The distribution list for all employees need not be altered. Although this method does provide a means to modify distribution list, this method is limited and does not provide any features to semi-permanent distribution lists that last for an extended period of time following the distribution of information to entries on that semi-permanent distribution list. In addition, this method does not provide the means for incorporating dynamic decision-making capabilities for determining whether to save a newly generated distribution list into message transmission instructions.

There remains a need for an advanced method for modifying previously generated distribution lists based on features of the entries currently in the list.

SUMMARY OF THE INVENTION

This method of the present invention describes a method to dynamically modify a currently created distribution list using criteria determined from the current entries in the list. After the generation of a distribution by a user and prior to submission of the message to entries on the generated list, the method of the present invention, examines the entries in the created distribution list. From this list, the invention identifies features of the entries. From these features, the method generates criteria that can be used to generate additional entries that may be included in the list. In one approach, the generated criteria are presented to the user for review and approval. If the user approves the criteria, the generated list is modified to add additional entries to the distribution based on the generated criteria. If the user rejects the criteria, the initially generated list is submitted and the message is sent to the entries on the initial list.

In another approach, prior to submitting the criteria to the user for approval, a new distribution list can be produced from the generated criteria. This new list can be submitted to the user for review and approval. If the user accepts the new list, it is used as the distribution list for the message. If the user rejects the new list, then the message is sent to the initially generated distribution list.

This invention enhances current art with the ability to add situational business flexibility, nested grouping capabilities and enable dynamic updates to a predefined distribution list. The disclosed methods enable temporary or permanent modification of distribution lists from information derived from the entries in the list. Such modifications are often needed when users do not know all persons that should receive certain information.

The invention includes methods to use mathematical formulas, logical operations, and programmable operators to create an adaptive group list that addresses situational needs of the sender and recipients. Note that such adaptive groups as defined here could be used in conjunction with any kind of electric communication methodologies.

Mathematical operations include:
"+" for addition, i.e., add a user to the group Logical operations can be:
UNION—for union of multiple sets The invention is a combination of known techniques in a non-obvious manner, as well as the creation of new techniques. The known elements, which are combined, are collaboration software and dynamic distribution lookups. The new techniques include the application of mathematical symbols to distribution lists and set operations upon distribution lists. The added flexibility of the present invention to existing technology with regard to the modification of distribution groups allows senders to modify existing, defined groups to ensure that all appropriate persons receive transmitted information.

DESCRIPTION OF THE DRAWINGS

FIG. 4 is a list of entries in multiple groups from which a user may want to send an electronic message to entries in the groups.

DETAILED DESCRIPTION OF THE INVENTION

The present invention provides a method for creating and/or modifying distribution lists used for mass distribution of information to entries on the distribution list. This method can apply to any form of distribution for example email messages or telephone messages. Although there can be various applications of the technology described in the present invention, the application used for the purpose of describing the invention will be an electronic mail application.

Figure 1:
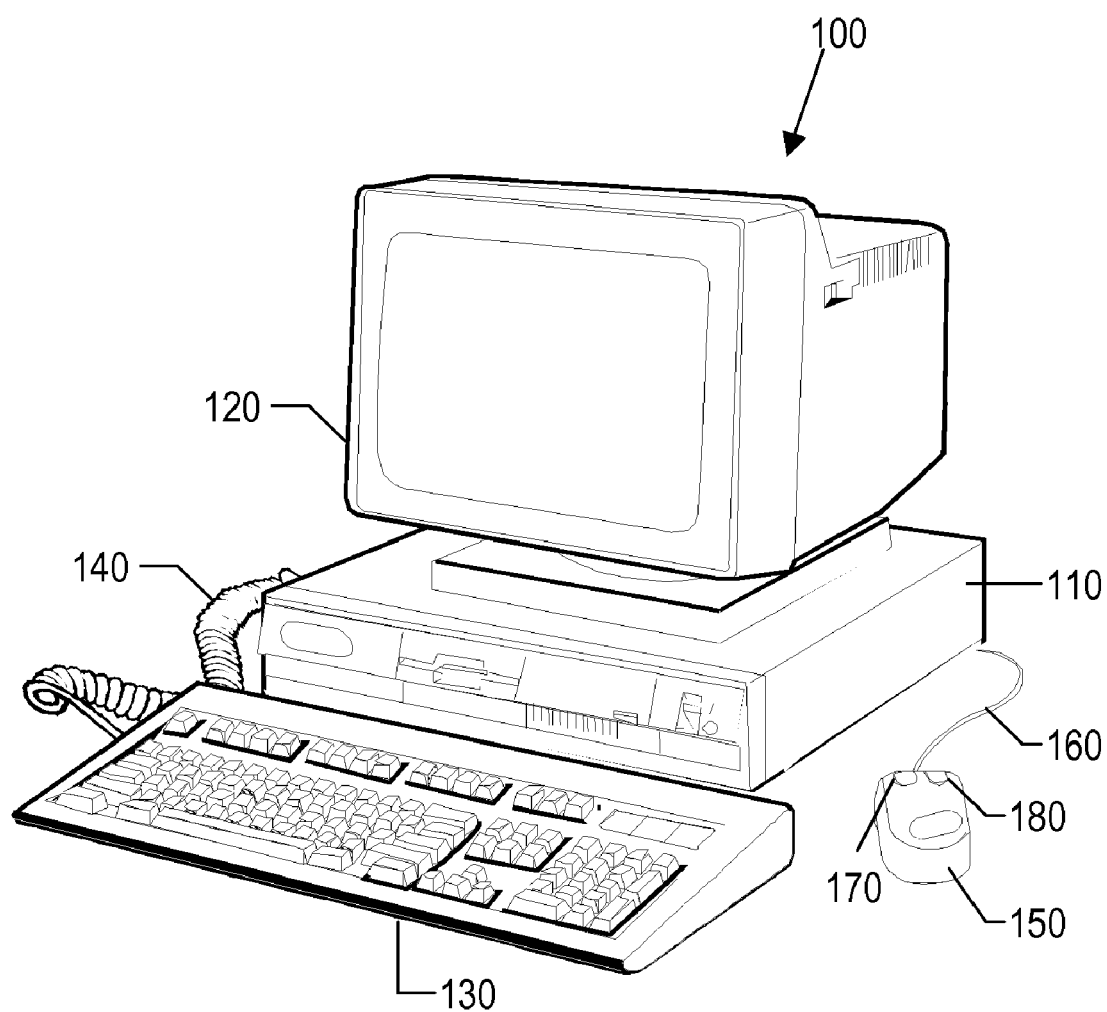
FIG. 1 is a pictorial representation of a computing device, which may be used in implementation of the present invention.

With reference now to FIG. 1, there is depicted a pictorial representation of computing device 100 which may be used in implementation of the present invention. Although the invention is described in terms of the device illustrated in FIG. 1, other types of electronic devices capable of transmitting and receiving information can be used in the implementation of the present invention. As seen in FIG. 1, data processing system 100 includes processor 110 that preferably includes a graphics processor, memory device and central processor (not shown). Coupled to processor 110 is video display 120 which may be implemented utilizing either a color or monochromatic monitor, in a manner well known in the art. Also coupled to processor 110 is keyboard 130. Keyboard 130 preferably comprises a standard computer keyboard, which is coupled to the processor by means of cable 140. Also coupled to processor 110 is a graphical pointing device, such as mouse 150. Mouse 150 is coupled to processor 110, in a manner well known in the art, via cable 160. As is shown, mouse 150 may include left button 170, and right button 180, each of which may be depressed, or "clicked", to provide command and control signals to data processing system 100. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system 100 may be implemented utilizing a computer.

Figure 2:
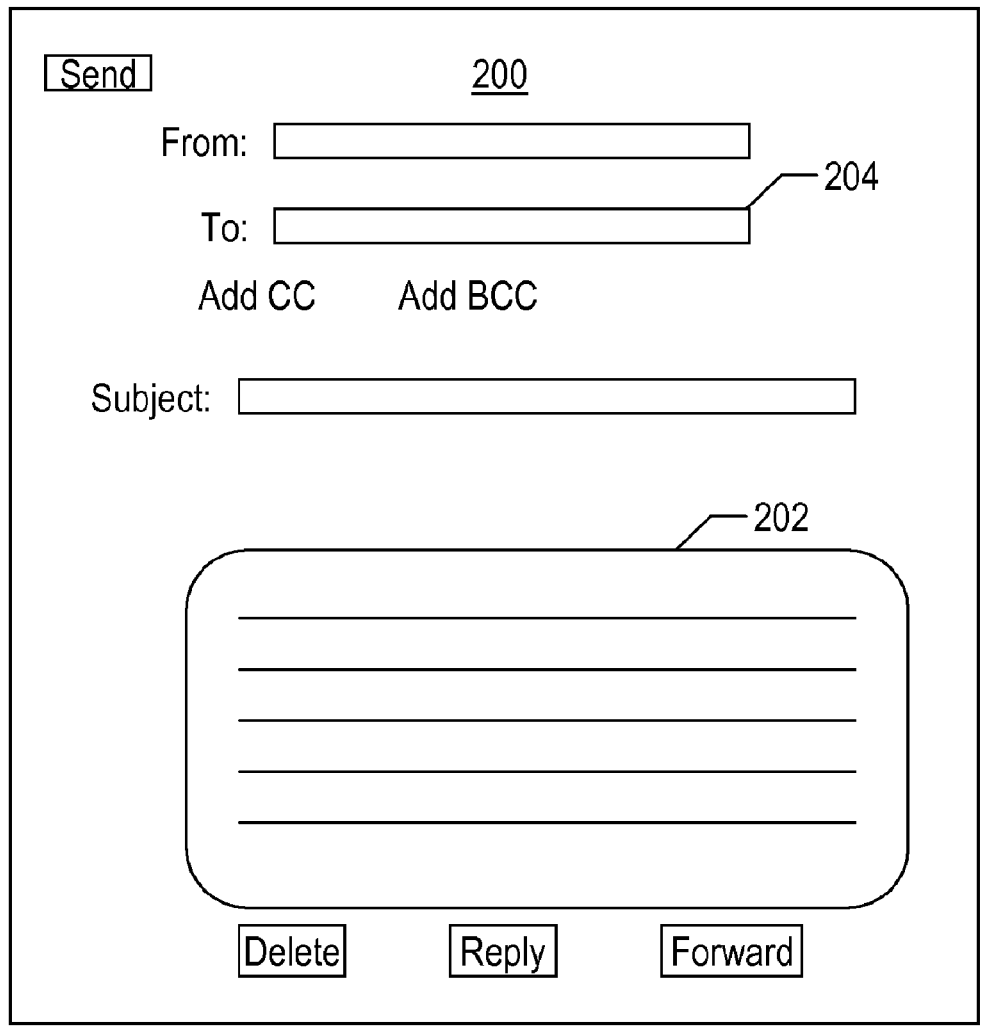
FIG. 2 is a screen of a device (a computer screen) used for transmission of information to entries on a distribution list.

FIG. 2 shows a screen 200 that a sender may use to designate the distribution list and the sending or distribution requirements for the message. As shown, the screen appears to be a typical screen used to compose and send an electric mail message. The message area 202 provides the place for the sender to compose the message. The screen also has many features that are common to electronic mail systems. The "To" field 204 also referred to as the 'destination field' provides a place for the sender to input the destination location information. Below the message area are other message controls available to the user.

Figure 3A:
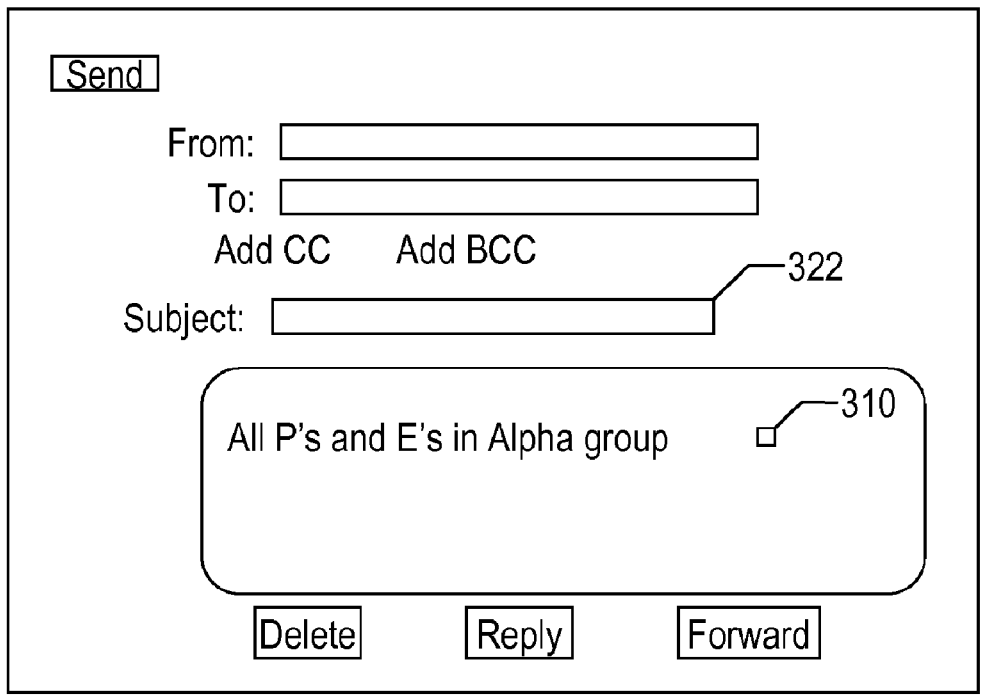
FIG. 3a shows a display screen presenting an additional search criterion.
Figure 3B:
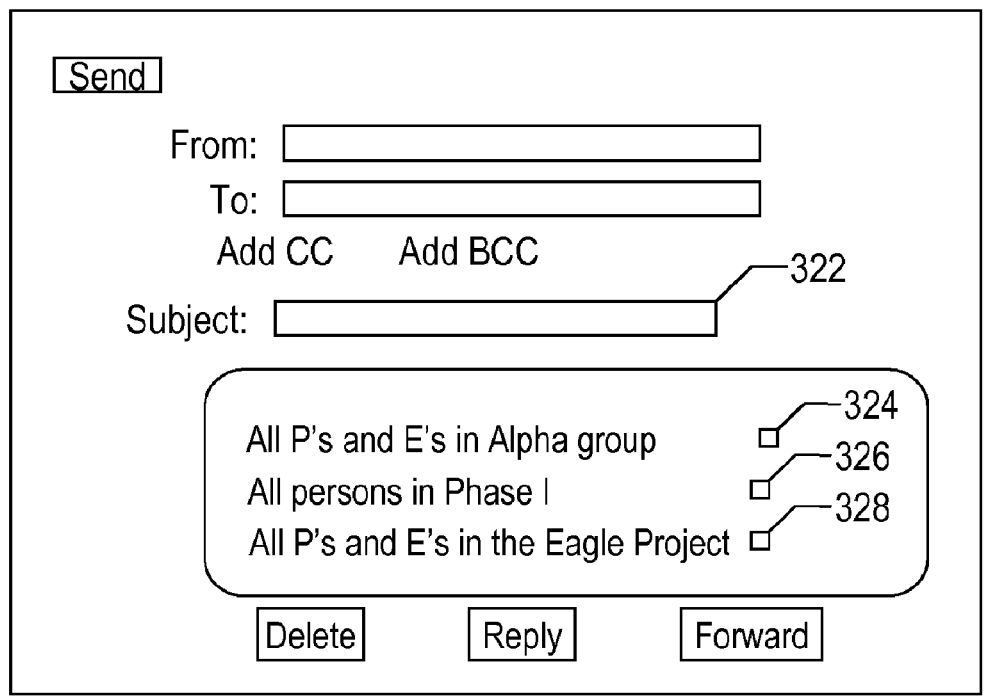
FIG. 3b shows a display screen presenting multiple additional search criteria.

Referring to FIG. 3a, shown is a view of a screen showing an optional criterion for modifying a distribution list. In accordance with this invention, the method will produce this modification criterion. When shown this list, the user can view this criterion and has the option to accept this modification criterion. In one embodiment, if the user decides to accept the criterion, the user can click the box 310. FIG. 3b shows a screen in which the present invention has generated multiple criteria for modifying a previously generated distribution list. In this embodiment, the method of the present invention produces multiple criteria that can be used to modify an existing list. The display can have the identity of the present list. This identity can be displayed in the subject line 322. This screen also displays multiple list modification options 324, 326 and 328. In an implementation of the invention, the user can select any of the options or none of the options. If the user does not want to select any of the list modification option, the user can click the send icon to submit the message to the distribution list as initially generated. If the user desires to modify the distribution list with one or more of the displayed modification options, the user can click each of the desired options and then click the send icon. After the user clicks the send icon, the method of the present invention will modify the distribution in accordance with the additional criteria identified by the user. After these modifications have been made, the message is submitted to the entries in the modified list.

FIG. 4 shows potential entries from which one can generate initial and modified distribution lists. These entries represent personnel that are part of a project referred to as the Eagle Project. In this project, there are two phases and four separate groups: Alpha, Beta, Delta and Gamma. There can be occasions when a message is sent to some persons in this project, but other persons in the project that should also receive the message are omitted from the distribution list. In addition, the personnel on the project are identified as leaders, engineers or programmers. This list of personnel can be stored in a memory location or directory such that the project, phase, group and each individual are stored in the memory location. The project information can be used to identify different criteria from which the present invention generates alternate distribution lists. The groups in FIG. 4 will be used to illustrate the steps in the present invention.

Figure 5:
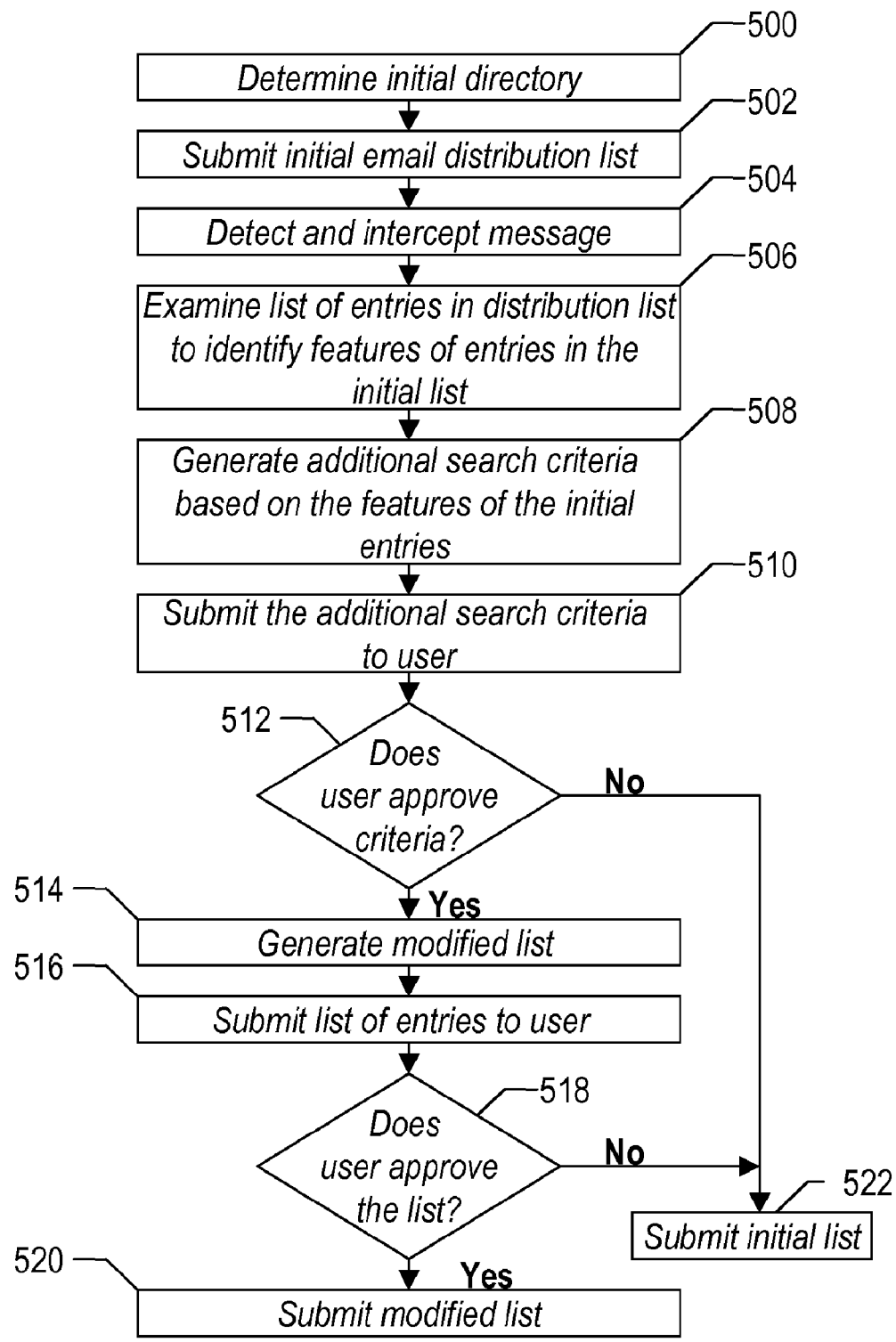
FIG. 5 is a flow diagram of a method in the implementation of an embodiment of the present invention.

FIG. 5 shows a flow diagram of a basic description of the method of the present invention. In this method, the initial step 500 is to establish an initial directory of potential list entries. Referring to FIG. 4, this initial directory could be the people included in the Eagle Project. The initial directory could also be a general company directory all employees or all persons in a particular department. This directory can be generated as desired by those implementing the method. In step 502, the user submits a message for electronic distribution. This message has an initial distribution of entries that are to receive this message. The method of the present invention detects when the user submits this initial message. Before this message reaches the email server, the present invention in step 504 detects and intercepts the message. At this point, step 506 examines the entries in the message. This examination attempts to identify other possible persons that may be included in the distribution based on common features with the entries in the initial distribution list. For example, a user may create a message for distribution to entries shown in FIG. 4b. This list contains entries from group alpha. An examination of this list can produce criteria for modifying the initial distribution list in step 508. One criterion can be all persons in the alpha group. Step 510 submits this criterion 310 to the user as shown in FIG. 3a. If the user desires to incorporate the criterion, the user can click the criteria 310 and sends the message. Step 512 determines that the user has accepted the criterion. At this point, step 514 modifies the initial list to add all of the entries from the Alpha Group and generate a new distribution list. This modified list can be resubmitted to the user for review in step 516. With this approach, the user can actually see the final of entries that will receive the message. This step also gives the user another opportunity to reject any changes in the initial list prior to sending a message. If the user approves the modified list in step 518, then step 520 submits the message to the entries on the modified list. If in step 512 or step 518, the user decides the keep the initial list, then the method moves to step 522 that submits the message to the entries in the initially generated distribution list.

Figure 6:
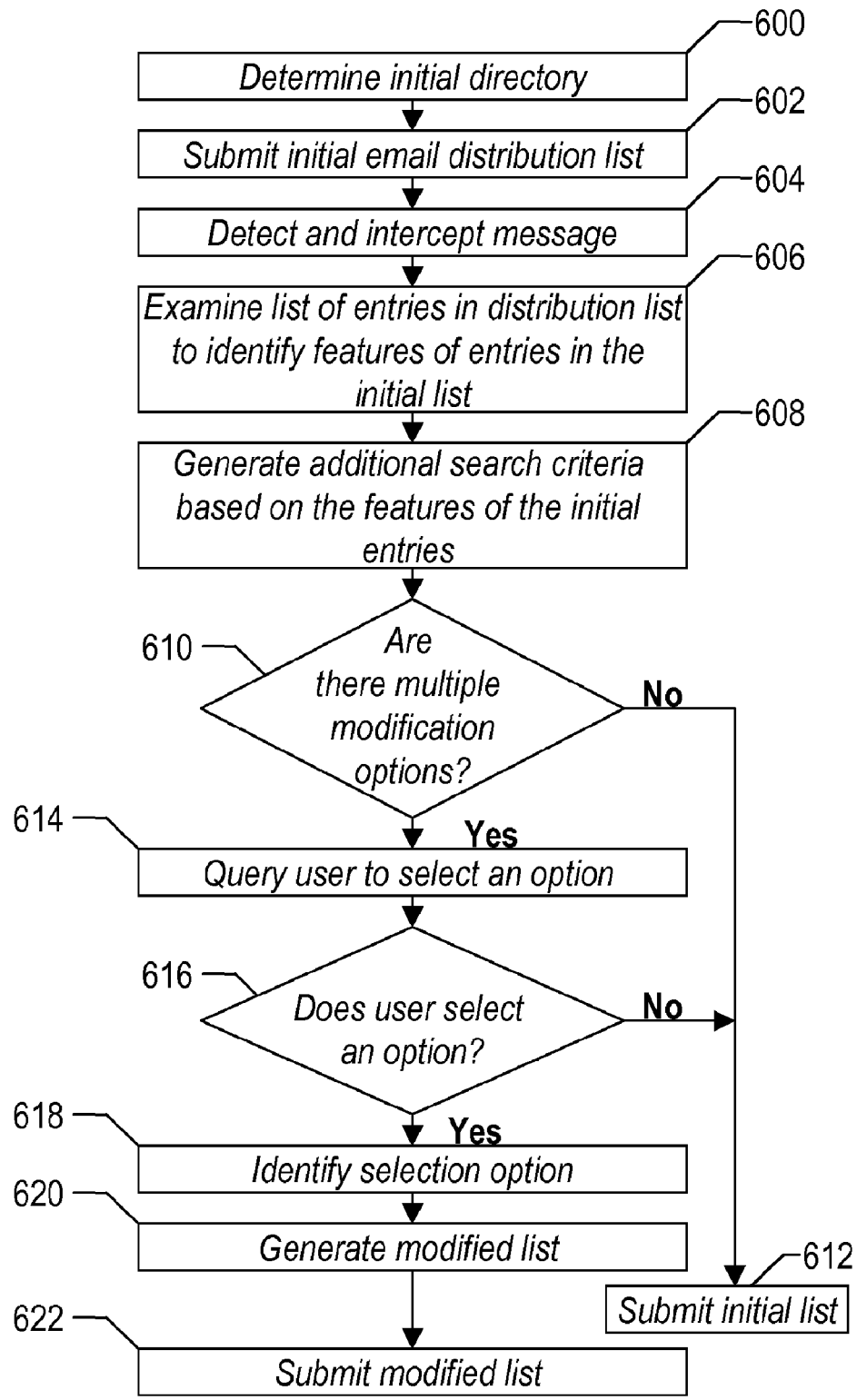
FIG. 6 is a flow diagram of the steps of the method of the present invention in which there are multiple options are present for modifying a distribution list.

FIG. 6 shows an embodiment of the present invention in which multiple modification criteria generated from the examination. As with the method of FIG. 5, the user generates an initial distribution list in step 602. The method detects and intercepts the message in step 604. As mentioned, this interception occurs prior to the message reaching the mail server. An examination of the list in FIG. 4b in step 606 can produce multiple criteria for modification of the list. One criterion can be all programmers and engineers in the alpha group. The initial list does not include engineer Alpha 2. A second criterion can be all persons in Phase I of the project. A third criterion can be all programmers and engineers in the entire project. Step 608 generates a list of multiple modification options shown in FIG. 3b. At this point, step 610 determines whether there are one or more modification options. If there is only one modification criterion, then the method can perform a modification of the initial list and submit this list in step 612. However, if in step 610, there are multiple modification options, then step 614 presents the options to the user for selection. In step 616, there is a determination of whether the user has selected a modification option. If the user decides not to accept any of the modification options, the method again moves to step 612, which submits the message with the initial distribution list. If step 616 detects that the user selected one or more of the modification options, then step 618 identifies the selected modification options. Step 620 then generates a modified distribution list based on the selected modification criteria. The message is submitted to the entries of the modified distribution list in step 622.

Figure 7:
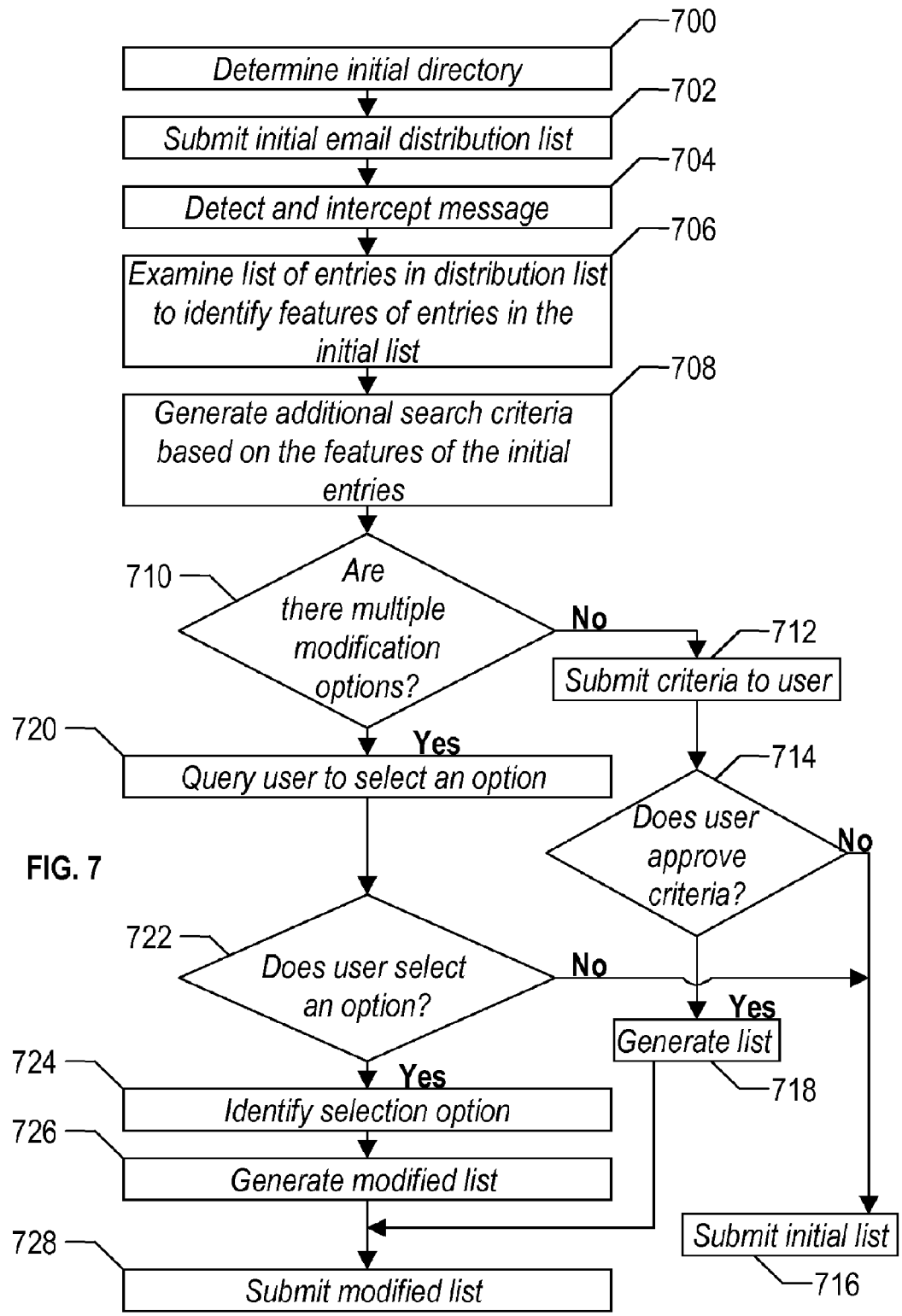
FIG. 7 is a flow diagram of the steps of the method of the present invention in which the user has the option to accept the modified criteria.

FIG. 7 shows an embodiment of the present invention in which the user approves the selection of one modification criterion or multiple modification criteria selections. As with the method of FIG. 6, the user generates an initial distribution list in step 702. The method detects and intercepts the message in step 704. As mentioned, this interception occurs prior to the message reaching the mail server. An examination of the list in FIG. 4b in step 706 can produce multiple criteria for modification of the list. Step 708 generates a list of multiple modification options shown in FIG. 3b. At this point, step 710 determines whether there are one or more modification options. When there is only one modification criterion, then the method moves to step 712, which submits this criterion to the user. In step 714 there is determination of whether the user wants to incorporate the modification into the distribution list. When the determination is that the user does not want to incorporate the modification criterion, then the method submits the message with the initial list of entries in step 716. If in step 714, the user selects to incorporate the modification criteria, then step 718 generates a new distribution list using the criterion. The message is then submitted to the modified distribution list in step 728.

Referring back to step 710, if there are multiple modification options, then step 720 presents the options to the user for selection. In step 722, there is a determination of whether the user has selected a modification option. If the user decides not to accept any of the modification options, the method again moves to step 716, which submits the message with the initial distribution list. If step 722 detects that the user selected one or more of the modification options, then step 724 identifies the selected modification options. Step 726 then generates a modified distribution list based on the selected modification criteria. The message is submitted to the entries of the modified distribution list in step 728.

To those skilled in the art, it is observed that this invention may have variations, such as: Different mathematical operators may be chosen to represent either the same or different operations defined in this disclosure; Other algebraic or set theory operations may be applied to distribution groups; and Different grouping operations may be used.

It is important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape, paper, floppy disc, hard disk drive, RAM, and CD-ROMs.

We claim:

1. A system comprising a processor, a memory coupled to the processor, and a computer readable storage device coupled to the processor, said storage device containing program code configured to be executed by the processor via the memory to implement a method for generating a modified distribution list of entries for receipt of an electronic transmission of information, the contents of the generated modified distribution list being based on the contents of entries contained in an initial distribution list, said method comprising:

detecting a message submitted for electronic distribution to each entry in the initial distribution list, said initial distribution list consisting of a plurality of entries, said message comprising said information;

intercepting the detected message before the message has reached an email server;

after said intercepting, examining the initial distribution list to identify a common characteristic possessed by each entry of the plurality of entries in the initial distribution list, said common characteristic possessed by each entry comprising said each entry being within a phase and/or group of a project;

after said examining, generating search criteria from the common characteristic;

determining that the generated search criteria has been approved by an originator of the initial distribution list;

generating the modified distribution list through use of the approved search criteria to select entries from groups of entries stored in a memory of the computing device, said modified distribution list consisting of multiple entries that comprise at least one entry not in the initial distribution list, each entry of the multiple entries possessing the common characteristic; and after said generating the modified distribution list, transmitting the message to each entry of the multiple entries in the modified distribution list.

2. A system comprising a processor, a memory coupled to the processor, and a computer readable storage device coupled to the processor, said storage device containing program code configured to be executed by the processor via the memory to implement a method for generating modified distribution lists of entries for receipt of an electronic transmission of information, the contents of the generated modified distribution list being based on the contents of entries contained in an initial distribution list, said method comprising:

detecting a message submitted for electronic distribution to each entry in the initial distribution list, said initial distribution list consisting of a plurality of entries, said message comprising said information;

intercepting the detected message before the message has reached an email server;

after said intercepting, examining the initial distribution list to identify a common characteristic possessed by each entry of the plurality of entries in the initial distribution list, said common characteristic possessed by each entry comprising said each entry being within a phase and/or group of a project;

after said examining, generating a plurality of search criteria from the common characteristic;

receiving a selected search criteria that was selected from the plurality of search criteria;

generating a modified distribution list through use of the selected search criteria to select entries from groups of entries stored in a memory of the computing device, said modified distribution list consisting of multiple entries that comprise at least one entry not in the initial distribution list, each entry of the multiple entries possessing the common characteristic; and after said generating the modified distribution list, transmitting the message to each entry of the multiple entries in the modified distribution list.

3. A computer program product comprising a computer-readable tangible storage device having computer readable program code stored therein, said program code configured to be executed by a processor of a computer device to implement a method for generating a modified distribution list of entries for receipt of an electronic transmission of information, the contents of the generated modified distribution list being based on the contents of entries contained in an initial distribution list, the method comprising:

detecting a message submitted for electronic distribution to each entry in the initial distribution list, said initial distribution list consisting of a plurality of entries, said message comprising said information;

intercepting the detected message before the message has reached an email server;

after said intercepting, examining the initial distribution list to identify a common characteristic possessed by each entry of the plurality of entries in the initial distribution list, said common characteristic possessed by each entry comprising said each entry being within a phase and/or group of a project;

after said examining, generating search criteria from the common characteristic;

either determining that the generated search criteria has been approved by an originator of the initial distribution list or receiving a selected search criteria that was selected from the generated search criteria;

generating the modified distribution list through use of the approved or selected search criteria to select entries from groups of entries stored in a memory of the computing device, said modified distribution list consisting of multiple entries that comprise at least one entry not in the initial distribution list, each entry of the multiple entries possessing the common characteristic; and after said generating the modified distribution list, transmitting the message to each entry of the multiple entries in the modified distribution list.

4. The computer program product of claim 3, wherein the method comprises said determining that the generated search criteria has been approved by the originator of the initial distribution list.

5. The computer program product of claim 3, wherein the method comprises said receiving the selected search criteria that was selected from the generated search criteria.

* * * * *